United States Patent [19]

Mishima

[11] Patent Number: 5,355,174
[45] Date of Patent: Oct. 11, 1994

[54] SOFT EDGE CHROMA-KEY GENERATION BASED UPON HEXOCTAHEDRAL COLOR SPACE

[75] Inventor: Yasushi Mishima, Tokyo, Japan

[73] Assignee: Imagica Corp., Kyoto, Japan

[21] Appl. No.: 31,884

[22] Filed: Mar. 16, 1993

[30] Foreign Application Priority Data

Jan. 22, 1993 [JP] Japan ................................ 5-027442

[51] Int. Cl.⁵ ............................................. H04N 9/75
[52] U.S. Cl. ..................................... 348/592; 348/597
[58] Field of Search ................................ 348/592, 597; H04N 9/75

[56] References Cited

U.S. PATENT DOCUMENTS

| 4,533,937 | 8/1985 | Yamamoto et al. | 348/592 |
|---|---|---|---|
| 4,589,013 | 5/1986 | Vlahos et al. | |
| 4,625,231 | 11/1986 | Vlahos . | |
| 4,953,008 | 8/1990 | Kaye . | |
| 4,954,881 | 9/1990 | Kaye . | |
| 5,087,965 | 2/1992 | Torre-Bueno | 348/592 |
| 5,089,882 | 2/1992 | Kaye et al. . | |

OTHER PUBLICATIONS

Porter, Thomas and Duff, Tom, "Compositing Digital Images", Computer Graphics, vol. 18, No. 3, Jul. 1984, pp. 253–258.

Nakamura, Jun-Ichiro and Kamakura, Kunikatsu, "High Quality Montage Pictures by a New Color Killer Soft Chromakey System" SMPTE Journal, vol. 90 (Feb. 1981), pp. 107–112.

Devereux, V. G., "Digital Chroma-Key and Mixer Units" Digital Television, edited by C. P. Sandbank, pp. 539–557, Chichester, England: John Wiley & Sons, Inc.

Abridged Translation of pp. 663–665 of Gazo-Kaiseki [Handbook For Image Analysis] Tokyo, Japan: Tokyo Daigaku Shuppan-kai, Jan. 17, 1991, Mikio Takagi and Haruhisa Shimoda.

Abridged Translation of Japanese Patent 1st Publication No. 62-66791 (Laid Open on Mar. 26, 1987) (Appln. No. 61-215621 filed on Sep. 12, 1986).

Abridged Translation of Japanese Patent 1st Publication No. 56-37786 (Laid Open on Apr. 11, 1981) (Appln No. 55-118983 filed on Aug. 28, 1980).

Primary Examiner—Mark R. Powell
Attorney, Agent, or Firm—Oblon, Spivak, McClelland, Maier & Neustadt

[57] ABSTRACT

Inner and outer hexoctahedrons respectively showing complete background and complete background are defined by combining triangular pyramids centered on a background representative color on RGB space. Key value is calculated by changing identification function parameters depending upon which of triangular pyramids constituting the hexoctahedron each pixel of the image belongs to. As a result, an improved foreground image for composite is obtained.

3 Claims, 12 Drawing Sheets

| IDENTIFICATION FUNCTION PARAMETER REGISTER 8 | | | | | |
|---|---|---|---|---|---|
| 0 | $DIN_0$ $DOUT_0$ | $EIN_0$ $EOUT_0$ | $lin_0$ $lout_0$ | $min_0$ $mout_0$ | $nin_0$ $nout_0$ |
| 1 | $DIN_1$ $DOUT_1$ | $EIN_1$ $EOUT_1$ | $lin_1$ $lout_1$ | $min_1$ $mout_1$ | $nin_1$ $nout_1$ |
| 2 | $DIN_2$ $DOUT_2$ | $EIN_2$ $EOUT_2$ | $lin_2$ $lout_2$ | $min_2$ $mout_2$ | $nin_2$ $nout_2$ |
| ---- | ---- | ---- | ---- | ---- | ---- |
| 47 | $DIN_{47}$ $DOUT_{47}$ | $EIN_{47}$ $EOUT_{47}$ | $lin_{47}$ $lout_{47}$ | $min_{47}$ $mout_{47}$ | $nin_{47}$ $nout_{47}$ |
| $C_0$ $(r_0 g_0 b_0)$ | | | | | |

FIG. 6

SOFT EDGE CHROMA-KEY GENERATION BASED UPON HEXOCTAHEDRAL COLOR SPACE

BACKGROUND OF THE INVENTION

The present invention relates to a chroma-key processing method and system for processing color image of various modes in the form of RGB numerical data into composite with another color image.

According to chroma-key technique used in producing a video image, a foreground object to be composited is placed in front of a background panel painted in monochrome, typically in blue, and is shot by a camera as material with blue background (hereinafter referred to as blue-back material). The shot image is variously processed into an image with key signals of blue portions being 0% and of foreground portions being 100%. The image with the key signals is supplied to a switching unit in a conversion system with a background different from that of the blue-back material to obtain a composite image. If the key signals have only binary states of either 0% or 100%, a contour of the foreground object after composite may become unnatural. In order to overcome the problem, conventionally a so-called soft chroma-key system is used to allow transitional values between 0% and 100%. According to the conventional soft chroma-key technique, key signals are generated in terms of distance on chromaticity diagram which can be quantitatively representative of hue and color saturation among three color attributes of hue, color saturation and color value. According to the Japanese Patent 1st publication No. 62-66791, data of RGB (Red, Green and Blue) three primary colors on a foreground image are converted into data (X, Z) on two-dimensional orthogonal coordinate system, using conversion equations:

$$X = \frac{\sqrt{3}}{2}(R-G)\sin\phi + \left[B - \frac{1}{2}(R+G)\right]\cos\phi$$

$$Z = \frac{\sqrt{3}}{2}(R-G)\cos\phi - \left[B - \frac{1}{2}(R+G)\right]\sin\phi$$

where $\phi$ is an angle of hue of the background color to B-Y axis on chromaticity diagram. The values of X and Z obtained from the above equations are used to obtain value k of key signal:

$$k = X - aZ^2$$

where a is an adjustable parameter. In reality, the value k is further used with variable gain k, and offset ko to obtain value k' as value of key signal:

$$k' = (k + k_o)k_g$$

According to this technique, data pairs of X and Z will draw a parabola with a focus and a directrix being respectively on the X and Z axes of a chromaticity diagram when the value k' becomes constant.

However, the orthogonal coordinate of X and Z in the prior art provides no information on color value and therefore cannot discriminate, for example, light blue from dark blue.

With the soft chroma-key system, the value of the key signal may take transitional value to process contour and semitransparent foreground. However, since such conventional system does not handle the build-up of the blue-back image based on a specific theory, extracted results may be often unnatural and/or any extra process step such as so-called "chroma cancel" which is inherently unnecessary may be required to improve apparent image quality.

In the case of division on chromaticity diagram by means of a single non-closing line, a foreground with colors of high and low saturations in combination cannot be processed by using a background with color of transitional saturation.

It has been proposed to determine parameters by cursor-pointing background positions on a screen, using a position pointer such as a mouse or tablet. However, this solution is limited to keying processing of a hard edge. Processing of dissolve portions of soft chroma-key with variable resistance cannot be intuitively manipulated.

According to the present invention, inputted RGB three primary color data are directly handled in three-dimensional space without mapping them over two-dimensional space such as a chromaticity diagram so as to use the data without loss of information quantity. Therefore, it is a function of 3 variables which determines the key value k of a key signal and it is expressed by a scalar field in RGB thee-dimensional space. This function is called an identification function.

When RGB data of foreground image taken by blue-back shooting are plotted in RGB three-dimensional space, pixels 1 of the background are distributed in a relatively small area near B axis as shown in FIG. 1. By contrast, pixels 2 of the foreground are distributed as several sets of banana-shaped areas at positions away from the pixels 1 of the background. Pixels on the boundary between pixels 1 and 2 are distributed substantially in an area of a triangle having its base and apex constituted by the banana-like distributed pixels 2 and the background pixels 1, respectively. In scalar field representative of key value k, it is ideal that there are the banana-like distributed pixels 2 by 100% and the background pixels 1 by 0% and that values gradually increase from the apex toward the base of the triangle.

The scalar field used to express identification function is defined by two hexoctahedrons 40 and 41 as shown in FIG. 2 with a shape suitable for distribution of the image data in RGB three-dimensional space, key value k being calculated which can smoothly express contour and/or semitransparent portions. Once key value k is determined, color of the pixel 2 of foreground portions related to background color such as semitransparent portions is converted to natural foreground color according to model induced from a theory of image composite.

Since the scalar field can be defined to include any arbitrary position on RGB three-dimensional space, restriction to background color is extensively reduced: and keying may be performed if there is no back color in the foreground color.

After chroma-key parameters have been set for hard edge, parameters for soft edge are specified for portions where even foreground may become transparent. Then, portions which are not to be transparent are repeatedly pointed by mouse or tablet on screen to set parameters for soft key.

A preferred embodiment of the present invention will be described in conjunction with the attached drawings.

BRIEF DESCRIPTION OF THE DRAWINGS

FIG. 6 is a table showing details of an identification function parameter register;

DETAILED DESCRIPTION OF THE PREFERRED EMBODIMENT

FIGS. 1 to 12 are directed to a preferred embodiment of the present invention.

Inputted data in the present invention are digital data of blue-back material expressed by RGB. Output data are also RGB digital data and are representative of extracted image of foreground where the blue portions of the blue-back material are expressed in black.

Figure 1:
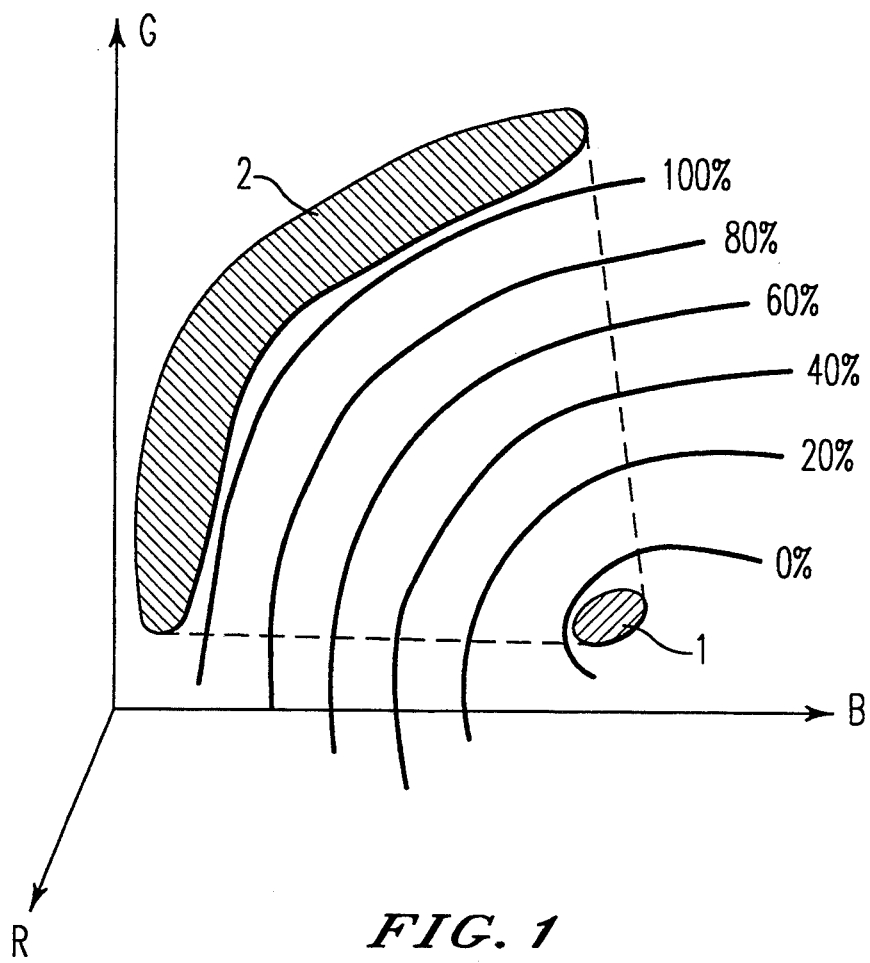
FIG. 1 is a schematic illustration of color distribution in RGB three-dimensional space and field of key value.
Figure 2:
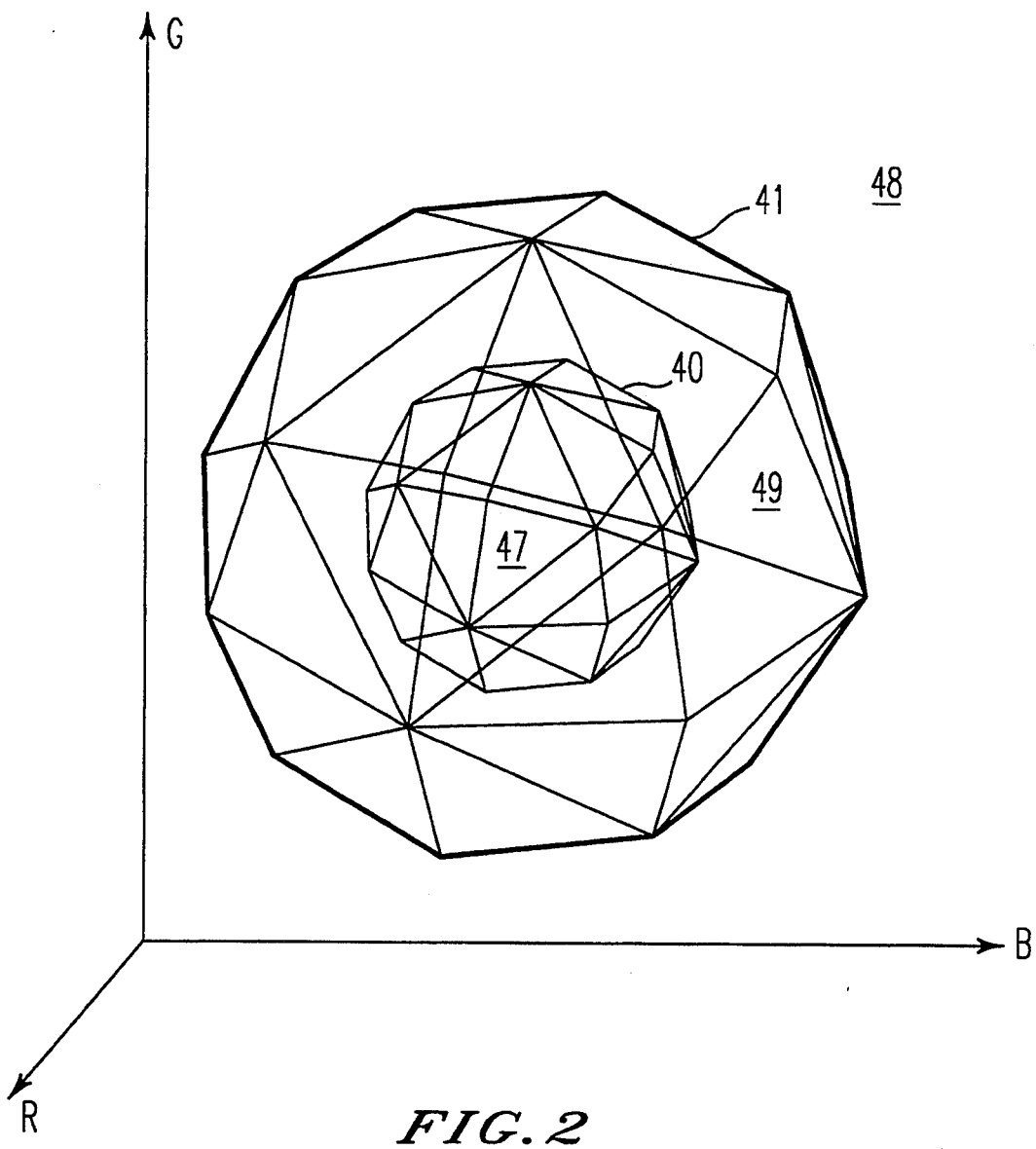
FIG. 2 shows two hexoctahedrons defined in RGB three-dimensional space.
Figure 3:
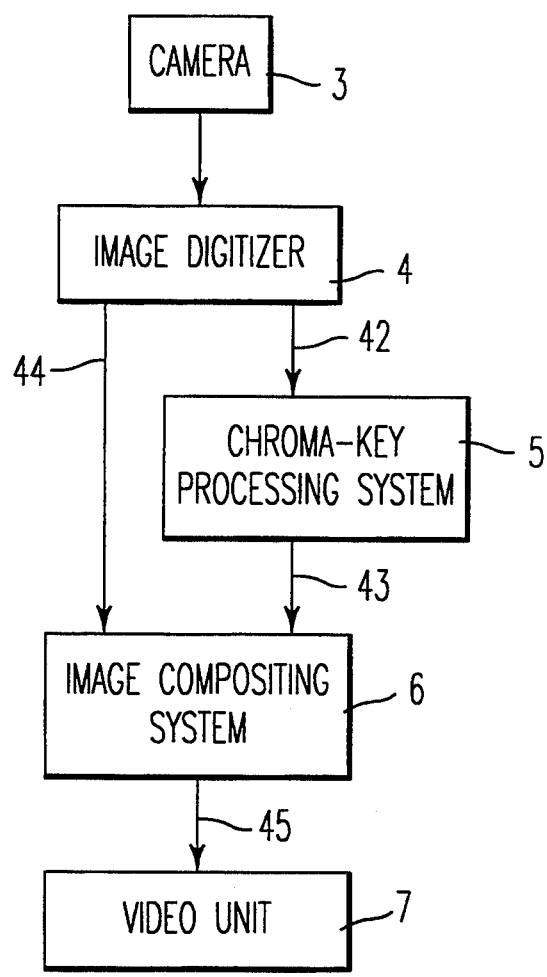
FIG. 3 schematically illustrates the entire image processing system including the system of the present invention.

Actual flow of image production is given in FIG. 3. First, blue-back material is shot by a camera 3 such as motion picture camera or video camera. In any case, data are converted by an image digitizer 4 such as film scanner or video digitizer into image data array 42 which is a set of numerical data on RGB three primary colors to be recorded on magnetic tape or fixed disk system. Spatial resolution of image and/or quantization bit width for color components may be freely selectable in the present invention.

The image data array 42 is read by a chroma-key processing system 5 according to the present invention and foreground extraction image 43 after processing is outputted as RGB digital data.

On the other hand, another image to be composited is also converted into image data 44 by the same procedure as above and is composited by an image compositing system 6 together with the foreground extraction image 43.

Composited results are recorded on film or video tape in the form of RGB digital image data array 45 by a video unit 7 such as a film recorder or frame memory.

Figure 7:
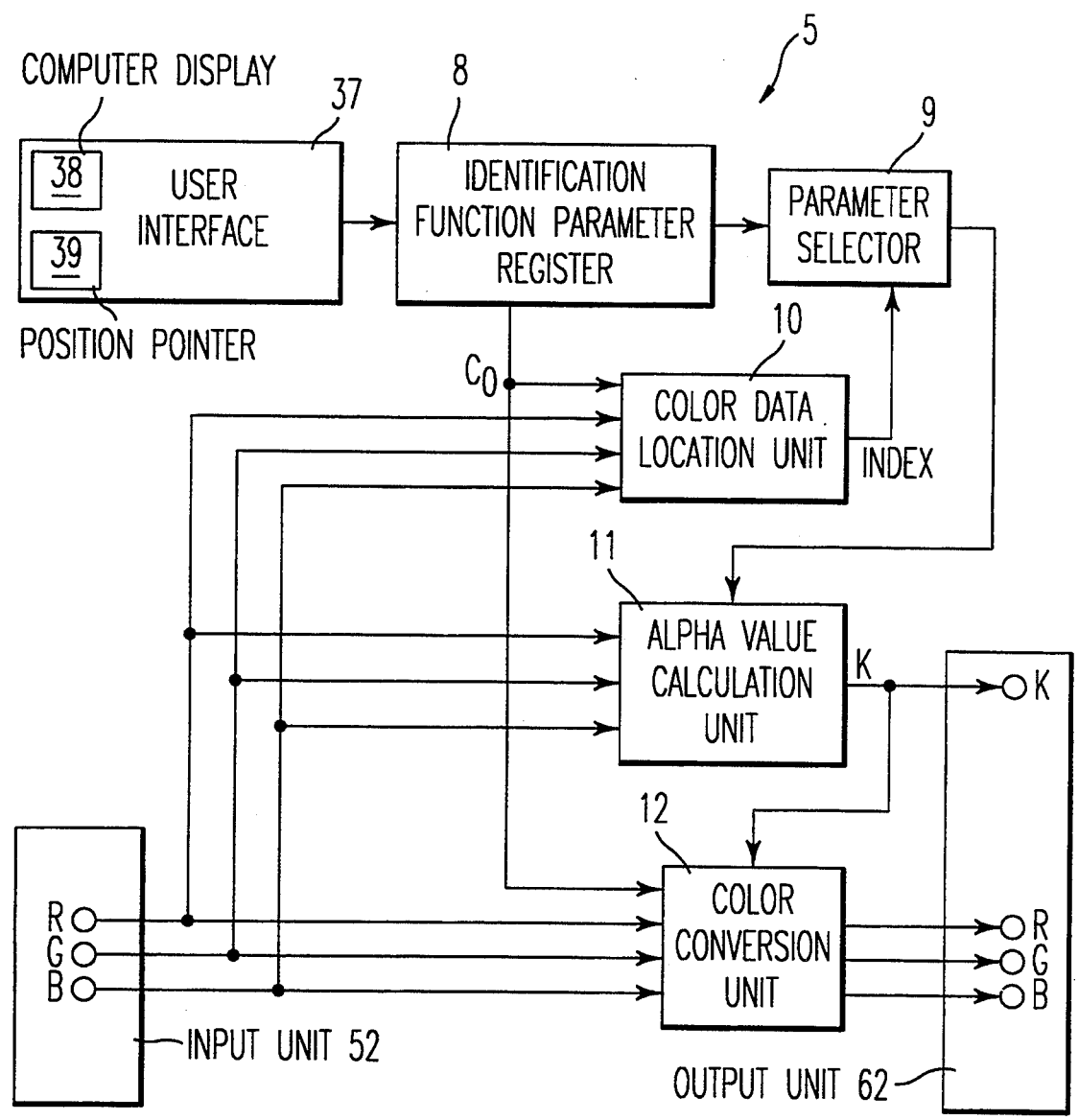
FIG. 7 is a block diagram of the entire system of the present invention.

In the chroma-key processing system 5 according to the present invention, the foreground image data array 42 is read first. This image is displayed on a computer display 38 in a user interface 37 as shown in FIG. 7 and parameters for generating key signals are prepared under computer-aided operation, using a position pointer 39 such as a mouse or tablet. This is usually performed once for each cut (a set of continuous frames from start to stop of a camera). Next, the mode is switched to continuous frame processing mode and the foreground image data arrays 42 are read one after another and all the pixels are processed using preset parameters. The processed results are outputted as foreground extraction image 43 and are sent to a subsequent process. The foreground extraction image 43 is of two kinds of data: that is, of the data of the key signals and of the foreground image which has been color-converted.

Definition of hexoctahedron to determine key value

Figure 4:
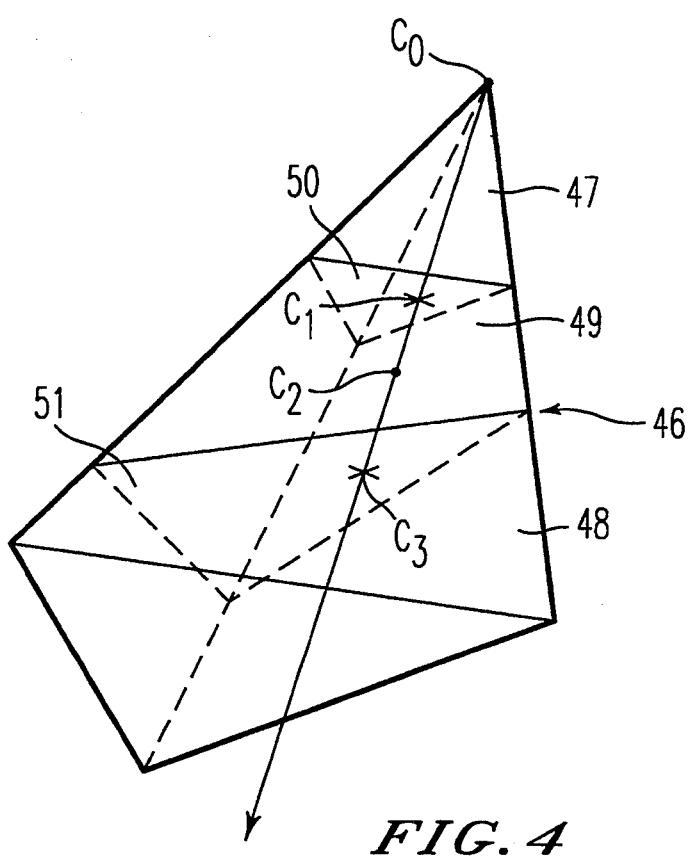
FIG. 4 is a schematic illustration of arrangement of key value in triangular pyramid.

The value k of the key signal is given by a linear equation as described below and the coefficient of the equation differs according to the position of of RGB color components of each foreground image datum in RGB three-dimensional space. As shown in FIG. 4, RGB three-dimensional space is defined by 48 triangular pyramids 46 which have common apices and the respective pyramid segments have different coefficient parameters. The value k defined by the parameters constitutes a scalar field which has a shape of hexoctahedron in RGB three-dimensional space as equipotential surface.

Forty-eight triangular pyramids are defined as follows: First, one color is determined as most typical background color and its RGB data are given. The color is called point of representative background color $C_o$. In order to determine this color, normally sampling is performed several times from the background color portion on screen as RGB data, using a position pointer such as a mouse or tablet; and an average value of sampled results is used. From a point in RGB three-dimensional space representing this color $C_o$, 26 straight lines are extended. Directional vectors of these straight lines are shown in Table 1. These are 6 lines in positive and negative directions along R, G and B axes, 12 lines of 45° direction in 4 quadrants on 3 planes respectively including R and G axes, G and B axes and B and R axes (hereinafter referred to as RG, GB and BR planes, respectively) such as straight lines equally dividing an angle ROG on RG plane and 8 lines coordinate of which the absolute values of 3 components are equal (i.e., 8 lines having the same absolute coordinate-values for 3 components) when the point of $C_o$ is taken as original point in 8 spaces defined by RG, GB and BR planes. These 26 straight lines are given by the following equation:

$$P_n = tv_n + C_o \, (n = 1, 2 \ldots 26)$$

where $v_n$ is a unit directional vector of a straight line indexed by n (Table 1). This vector is invariable.

Triangular pyramid 46 is formed by 3 adjacent straight lines among these 26 straight lines. Indices for 48 triangular pyramids 46 and indices for 3 straight lines constituting each triangular pyramid are shown in Table 2. These triangular pyramid spaces are part of RGB three-dimensional space cut off by 9 planes which pass through the point of $C_o$. These 9 planes are 3 planes respectively parallel to RG, GB and BR planes, 2 planes including G axis and angularly displaced from RG plane respectively by 45° and −45°, 2 planes including B axis and angularly displaced from GB plane respectively by 45° and −45° and 2 planes including R axis and angularly displaced from BR plane respectively by 45° and −45°.

TABLE 1

| | |
|---|---|
| 0 | (1,0,0) |
| 1 | (0,1,0) |

TABLE 1-continued

| | |
|---|---|
| 2 | (0,0,1) |
| 3 | (−1,0,0) |
| 4 | (0,−1,0) |
| 5 | (0,0,−1) |
| 6 | (.707,.707,0) |
| 7 | (.707,−.707,0) |
| 8 | (−.707,.707,0) |
| 9 | (−.707,−.707,0) |
| 10 | (0,.707,.707) |
| 11 | (0,.707,−.707) |
| 12 | (0,−.707,.707) |
| 13 | (0,−.707,−.707) |
| 14 | (.707,0,.707) |
| 15 | (−.707,0,.707) |
| 16 | (.707,0,−.707) |
| 17 | (−.707,0,−.707) |
| 18 | (.577,.577,.577) |
| 19 | (.577,.577,−.577) |
| 20 | (.577,−.577,.577) |
| 21 | (.577,−.577,−.577) |
| 22 | (−.577,.577,.577) |
| 23 | (−.577,.577,−.577) |
| 24 | (−.577,−.577,.577) |
| 25 | (−.577,−.577,−.577) |

TABLE 2

| triangular pyramid No. | straight line index | triangular pyramid No. | straight line index |
|---|---|---|---|
| 0 | 18,0,6 | 24 | 19,0,16 |
| 1 | 18,6,1 | 25 | 19,16,5 |
| 2 | 18,1,10 | 26 | 19,5,11 |
| 3 | 18,10,2 | 27 | 19,11,1 |
| 4 | 18,2,14 | 28 | 19,1,6 |
| 5 | 18,14,0 | 29 | 19,6,0 |
| 6 | 22,1,8 | 30 | 23,1,11 |
| 7 | 22,8,3 | 31 | 23,11,5 |
| 8 | 22,3,15 | 32 | 23,5,17 |
| 9 | 22,15,2 | 33 | 23,17,3 |
| 10 | 22,2,10 | 34 | 23,3,8 |
| 11 | 22,10,1 | 35 | 23,8,1 |
| 12 | 24,3,9 | 36 | 25,3,17 |
| 13 | 24,9,4 | 37 | 25,17,5 |
| 14 | 24,4,12 | 38 | 25,5,13 |
| 15 | 24,12,2 | 39 | 25,13,4 |
| 16 | 24,2,15 | 40 | 25,4,9 |
| 17 | 24,15,3 | 41 | 25,9,3 |
| 18 | 20,4,7 | 42 | 21,4,13 |
| 19 | 20,7,0 | 43 | 21,13,5 |
| 20 | 20,0,14 | 44 | 21,5,16 |
| 21 | 20,14,2 | 45 | 21,16,0 |
| 22 | 20,2,12 | 46 | 21,0,7 |
| 23 | 20,12,4 | 47 | 21,7,4 |

In a triangular pyramid 46, the value k of key signal is defined by two planes not crossing each other, i.e., by two triangles (FIG. 4). To make scalar field $C^o$ continuous, adjacent triangles of triangular pyramids 46 have common apices so that the two hexoctahedrons 40 and 41 determine key value k of any color in RGB three-dimensional space. Forty-eight triangles, each of which is defined by taking a point on each of the 26 straight lines and connecting points of 3 straight lines constituting each triangular pyramid 46, make up a hexoctahedron (forty-eight-faced polyhedron) 40 or 41. Scalar field is determined by arranging the two hexoctahedrons 40 and 41 which are smaller and larger and do not cross with each other.

Each hexoctahedron 40 or 41 is defined by 29 parameters, i.e., 26 Euclidean distances in RGB three-dimensional space from the point of the background representative color $C_o$ to each vertex and 3 components of the background representative color $C_o$. Since the background representative colors of the smaller and larger hexoctahedrons 40 and 41 are the same, after all the hexoctahedrons 40 and 41 are defined by 55 adjustable parameters.

These data are set by user-interface computer program and are stored on a main memory.

Qualitatively, of these two hexoctahedrons 40 and 41, the pixels 1 of the color expressed by RGB data in a background region 47 which is inner of the smaller hexoctahedron 40 are regarded to have key value by 0% for the reason that these are completely in the background. The pixels 2 of the color expressed by RGB data in a fourground region 48 which is the outer of the large hexoctahedron 41 are regarded to have key value by 100% for the reason that these are completely in the foreground. A region between the two hexoctahedrons 40 and 41 are processed as soft key region, i.e. neither background nor foreground.

Alpha value calculation processing is as follows: Of two planes 50 and 51 in the triangular pyramid 46 space, the one closer to the background representative color $C_o$ is the plane of the smaller hexoctahedron 40. When the color datum of a foreground pixel is closer to the background representative color $C_o$ than this plane 50, key the value k at the pixel is 0%. If it is outside the other plane 51, key the value is 100%. If it is between the two planes, the closer it is to the inner plane 50, the lower key the value k it has. The closer it is to the outer plane 51, the higher key the value k is. Such key values k are calculated as function of distance from the background representative color $C_o$.

It is supposed that the foreground pixel data to be processed is $C_r$ and that points where straight line connecting $C_r$ with $C_o$ crosses the inner and outer planes 50 and 51 are $C_1$ and $C_2$, respectively. If it is supposed that a distance from $C_o$ to $C_r$, $C_1$ and $C_2$ are $l_r$, $l_1$ or $l_2$, respectively, the value k is given by $$k = \begin{cases} 0 & (l_r \leq l_1) \\ 1 & (l_r \geq l_2) \\ \dfrac{l_r - l_1}{l_2 - l_1} & (l_1 < l_r < l_2) \end{cases}$$

Figure 5:
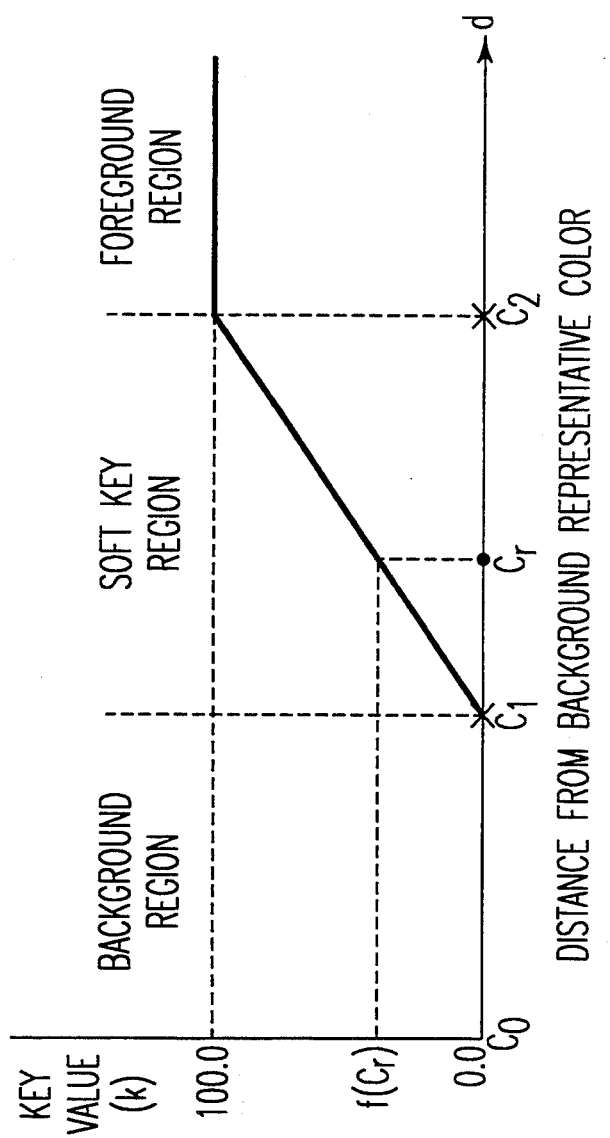
FIG. 5 is a graph showing function of key value and distance from background representative color.

FIG. 5 is a graphic representation of this function.

The distance in color space is calculated as follows: The indices of 3 straight lines constituting a triangular pyramid 46 are read from a look-up table (FIG. 6) and positions of apices of the two hexoctahedrons 40 and 41 on each of the straight lines are taken up as distances from $C_o$ from main memory. If subscript , is used as index for the straight line, apices $A_1$ and $B_1$ of inner and outer triangles, respectively, on each straight line are calculated as:

$$A_i = a_i v_i + C_o$$

$$B_i = b_i v_i + C_o$$

Equations for the inner and outer planes are:

Inner plane: $l_{in}r + m_{in}g + n_{in}b + o_{in} = 0$

Outer plane: $l_{out}r + m_{out}g + n_{out}b + o_{out} = 0$

Coefficients of these equations can be calculated using coordinates since each of the planes passes through three apices given by $A_i$ or $B_i$.

If it is supposed that components of the foreground pixel data $C_r$ and of the background representative color $C_o$ are $(r_r, g_r, b_r)$ and $(r_o, g_o, b_o)$, respectively, straight line connecting these points are given by the following equation:

$$C = \begin{pmatrix} r \\ g \\ b \end{pmatrix}$$

$$= \begin{pmatrix} r_r - r_0 \\ g_r - g_0 \\ b_r - b_0 \end{pmatrix} t + \begin{pmatrix} r_0 \\ g_0 \\ b_0 \end{pmatrix}$$

$$= (C_r - C_0)t + C_0$$

Simultaneous equations of the plane equation with the straight line equations are solved as:

$$t_{in} = \frac{-l_{in}r_0 - m_{in}g_0 - n_{in}b_0 - o_{in}}{l_{in}(r_r - r_0) + m_{in}(g_r - g_0) + n_{in}(b_r - b_0)}$$

$$t_{out} = \frac{-l_{out}r_0 - m_{out}g_0 - n_{out}b_0 - o_{out}}{l_{out}(r_r - r_0) + m_{out}(g_r - g_0) + n_{out}(b_r - b_0)}$$

Obtained here are parameters of length. The parameters $t_{in}$ and $t_{out}$ are lengths between the points $C_2$ and $C_o$ and between the points $C_1$ and $C_o$, respectively, when length between the points $C_r$ and $C_o$ is 1 or unit.

Using the parameters tin and tout, the equation of the value k expressed by $l_r$, $l_1$ and $l_2$ is calculated as:

$$k = \begin{cases} 0 & (t_{in} \geq 1) \\ 1 & (t_{out} \leq 1) \\ \dfrac{1 - t_{in}}{t_{out} - t_{in}} & (t_{in} < 1, t_{out} > 1) \end{cases}$$

The equations to obtain tin and tout are calculated for all pixels of the foreground. Development of the denominators of the equations results in:

$$t_{in} = \frac{-l_{in}r_0 - m_{in}g_0 - n_{in}b_0 - o_{in}}{l_{in}r_r + m_{in}g_r + n_{in}b_r - (l_{in}r_0 + m_{in}g_0 + n_{in}b_0)}$$

$$t_{out} = \frac{-l_{out}r_0 - m_{out}g_0 - n_{out}b_0 - o_{out}}{l_{out}r_r + m_{out}g_r + n_{out}b_r - (l_{out}r_0 + m_{out}g_0 + n_{out}b_0)}$$

The numerator and three terms of the denominator, which do not depend upon $C_r$ and are constant in the triangular pyramid 46, can be calculated in advance. Thus, before going into the stage of processing RGB signals, the coefficients of the equations for the respective planes 50 and 51 of the hexoctahedrons 40 and 41 are obtained and these terms are calculated as identification function parameters $DIN_n$ and $DOUT_n$ (numerator) and $EIN_n$ and $EOUT_n$ (sum of three terms of denominator), i.e.

$$DIN = -l_{in}r_0 - m_{in}g_0 - n_{in}b_0 - O_{in}$$

$$EIN = l_{in}r_0 + m_{in}g_0 + n_{in}b_0$$

$$DOUT = -l_{out}r_0 - m_{out}g_0 - n_{out}b_0 - O_{out}$$

$$EOUT = l_{out}r_0 + m_{out}g_0 + n_{out}b_0$$

These are stored to an identification function parameter register 8 (FIG. 6) together with Cr as well as lout, mout, nout, lin, min and nin.

Processing of RGB Signals for foreground image

For the image to be processed, all pixel data 42 constituting foreground in RGB digital data are continuously inputted into the chroma-key processing system 5. The chroma-key processing system 5 performs processings independently for each pixel.

Internal structure of the chroma-key processing system 5 is as shown in FIG. 7. RGB digital data for one pixel obtained from an input unit 52 are sent to a color data location unit 10 (for identifying a belonging triangular pyramid), an alpha value calculation unit 11 and a color conversion unit 12.

Figure 8:
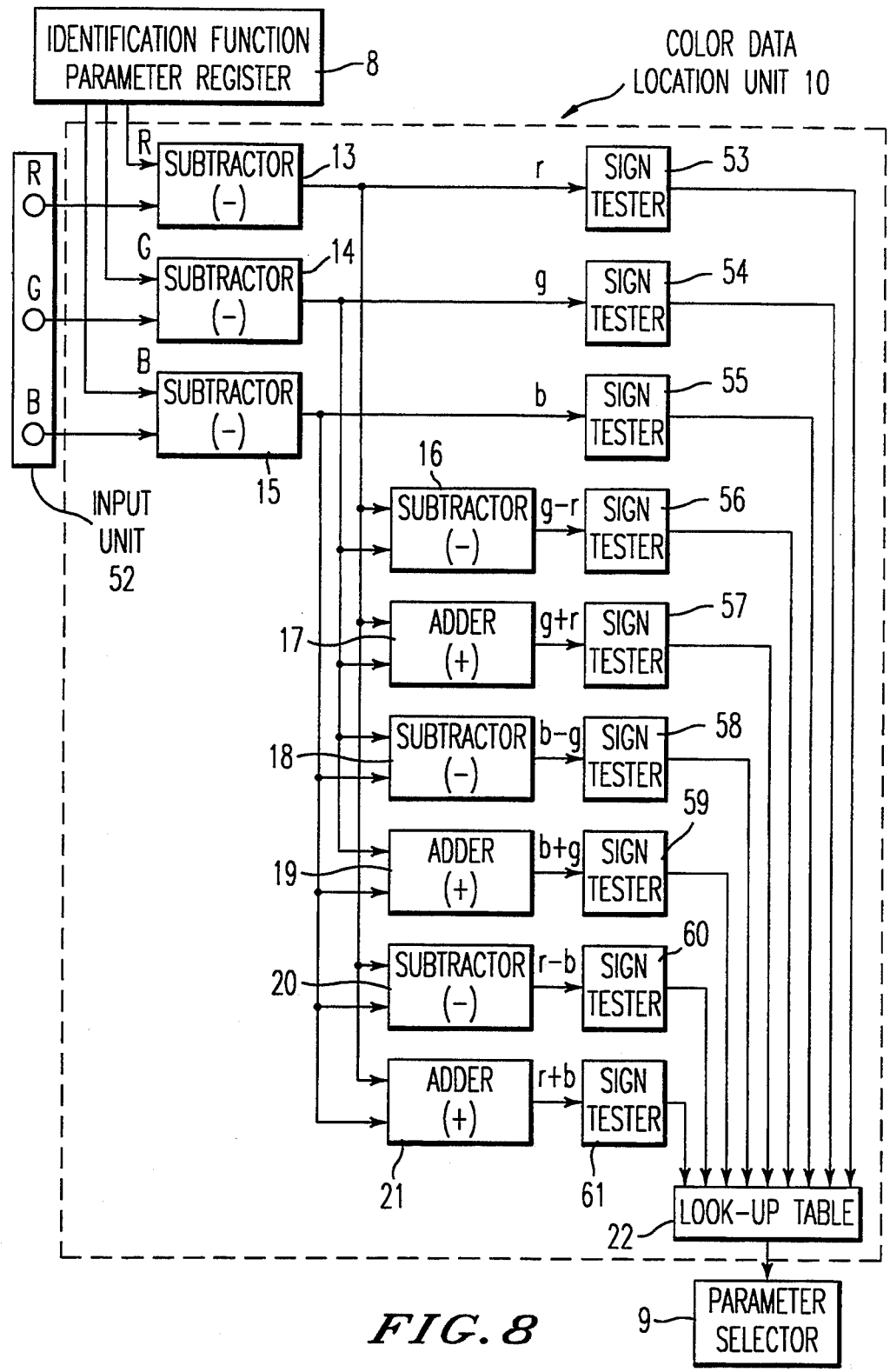
FIG. 8 is a block diagram of a color data location unit.

First, processing is performed at the color data location unit 10 as shown in FIG. 8. The background representative color $C_o$ is present in the register 8.

RGB digital data of the foreground pixel 2 from the input unit 52 is sent to subtracters 13, 14 and 15 for each component and together with the data of the background representative color $C_o$ of the register 8. The data obtained from the subtracters 13, 14 and 15 are three-dimensional relative coordinates of the foreground pixel 2 in relation to the background representative color $C_o$. Since 48 triangular pyramid segments are spaces obtained through cutting by 9 planes, a belonging triangular pyramid 46 can be identified by wholly investigating to which half-space the foreground pixel data belong with respect to each plane.

The belonging half-space to the planes parallel to RG, GB and BR planes can be determined by checking the sign of the component of relative coordinates. To the planes tilted by 45°, it can be determined by checking magnitude relation of the component or magnitude relation of the component with replaced sign. From three relative coordinates of RGB, two are picked up and processed through the subtracters 16, 18 and 20 and adders 17, 19 and 21 and a resultant sign is checked. Since a triangular pyramid 46 to which the foreground pixel 2 belongs is known beforehand from a combination of 9 signs, a look-up table 22 with corresponding triangular pyramid indices to nine-bit address is available (Table 3). Each of 9 sign testers 53 to 61 outputs "HIGH" and "LOW" when positive and negative, respectively, so that the address is supplied to the look-up table 22 as 9-bit numerical value. As the result, index of the belonging triangular pyramid is obtained as are output of the color data location unit 10 and is given to the parameter selector 9 which is downstream of the register 8.

TABLE 3

| bit pattern | desimal notation | triangular pyramid No. | bit pattern | desimal notation | triangular pyramid No. |
|---|---|---|---|---|---|
| 111010111 | 471 | 0 | 110010011 | 403 | 24 |
| 111110111 | 503 | 1 | 110010010 | 402 | 25 |
| 111110101 | 501 | 2 | 110110010 | 434 | 26 |
| 111111101 | 509 | 3 | 110110110 | 438 | 27 |

TABLE 3-continued

| bit pattern | desimal notation | triangular pyramid No. | bit pattern | desimal notation | triangular pyramid No. |
| --- | --- | --- | --- | --- | --- |
| 111011101 | 477 | 4 | 110110111 | 439 | 28 |
| 111011111 | 479 | 5 | 110010111 | 407 | 29 |
| 011110100 | 244 | 6 | 010110110 | 182 | 30 |
| 011100100 | 228 | 7 | 010110010 | 178 | 31 |
| 011101100 | 236 | 8 | 010100010 | 162 | 32 |
| 011101101 | 237 | 9 | 010100000 | 160 | 33 |
| 011111101 | 253 | 10 | 010100100 | 164 | 34 |
| 011110101 | 245 | 11 | 010110100 | 180 | 35 |
| 001101000 | 104 | 12 | 000100000 | 32 | 36 |
| 001001000 | 72 | 13 | 000100010 | 34 | 37 |
| 001001001 | 73 | 14 | 000000010 | 2 | 38 |
| 001001101 | 77 | 15 | 000001010 | 10 | 39 |
| 001101101 | 109 | 16 | 000001000 | 8 | 40 |
| 001101100 | 108 | 17 | 000101000 | 40 | 41 |
| 101001011 | 331 | 18 | 100001010 | 266 | 42 |
| 101011011 | 347 | 19 | 100000010 | 258 | 43 |
| 101011111 | 351 | 20 | 100010010 | 274 | 44 |
| 101011101 | 349 | 21 | 100010011 | 275 | 45 |
| 101001101 | 333 | 22 | 100011011 | 283 | 46 |
| 101001001 | 329 | 23 | 100001011 | 267 | 47 |

Figure 9:
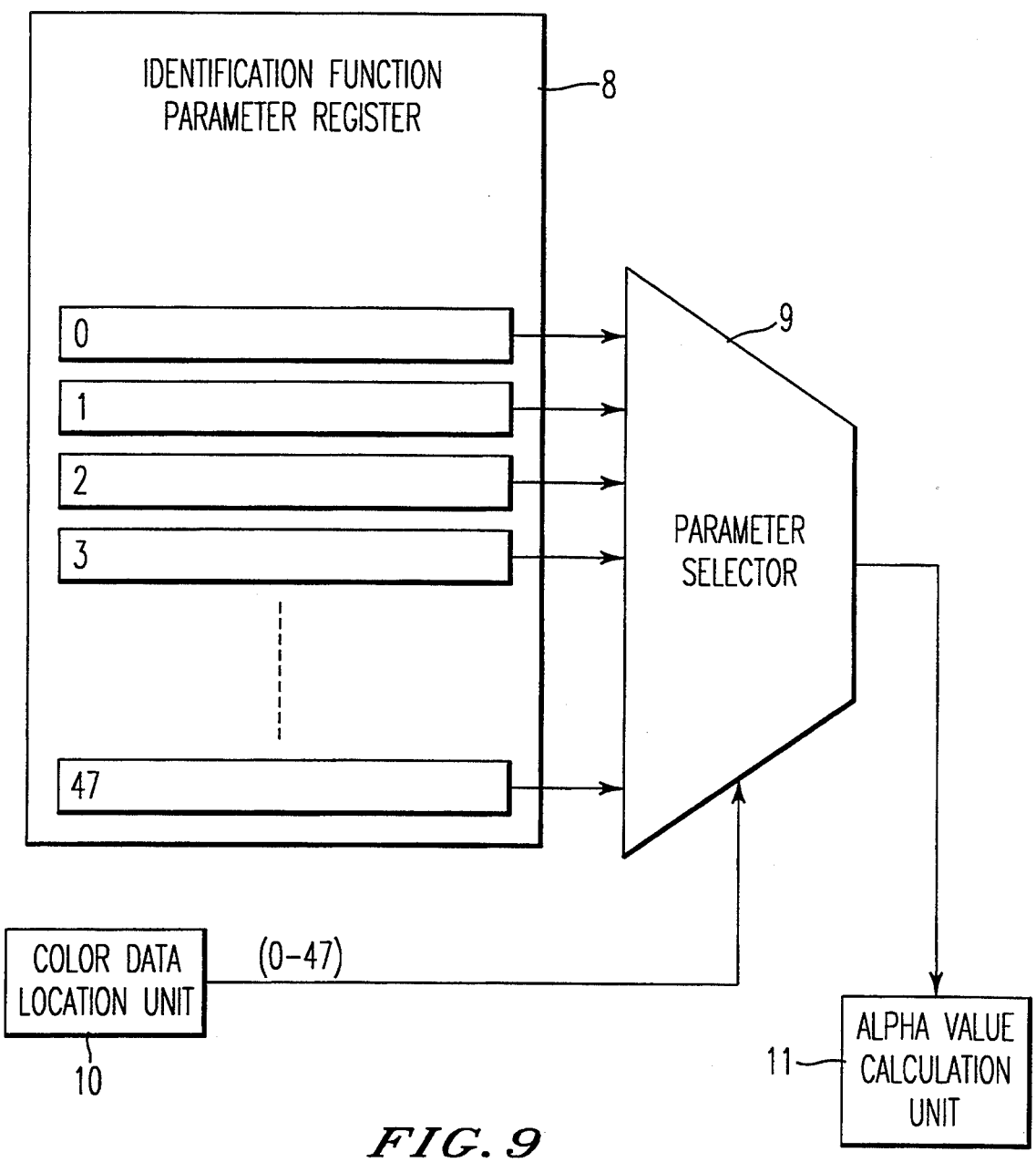
FIG. 9 shows a selector model of an identification function parameter register.

When triangular pyramid indices 0 to 47 are given from the color data location unit 10 as shown in FIG. 9, the parameter selector 9 sends identification function parameters $DIN_n$, $DOUT_n$, $EIN_n$, $EOUT_n$, $l_{out}$, $m_{out}$, $n_{out}$, $l_{in}$, $m_{in}$ and $n_{in}$ to the alpha value calculation unit 11.

Figure 10:
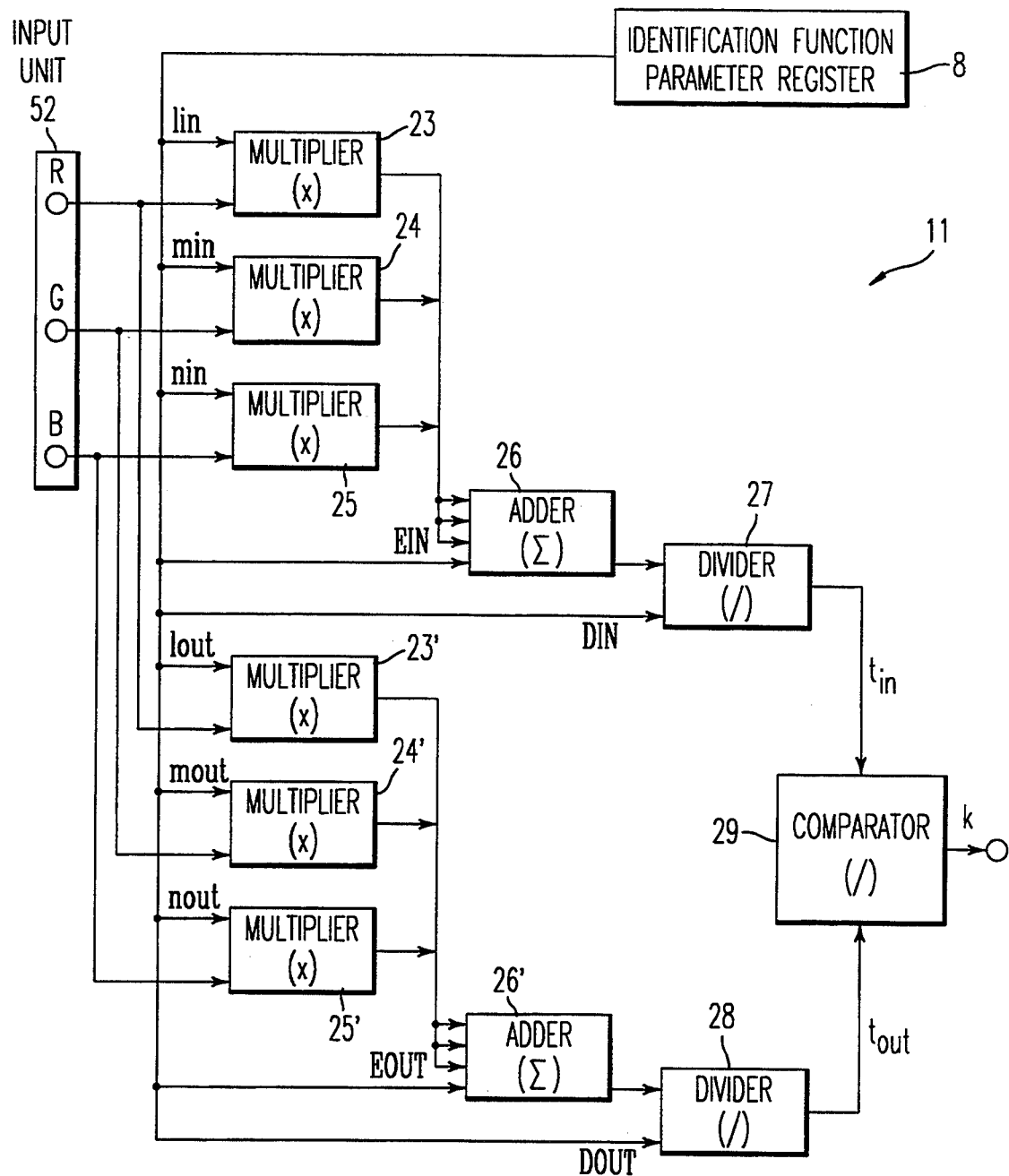
FIG. 10 is a block diagram of an alpha value calculation unit.
Figure 11:
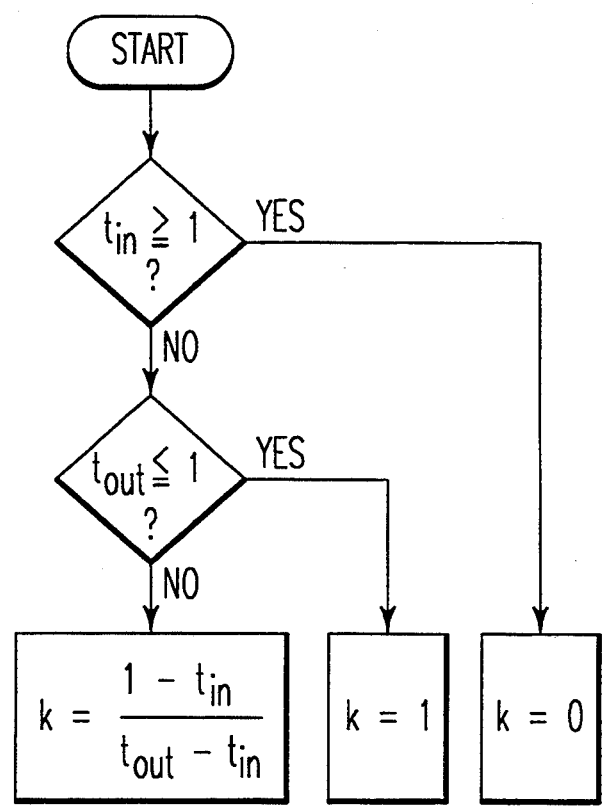
FIG. 11 is a flow chart for calculating value k through allocation in alpha value calculation unit.

In the unit 11, the above-mentioned k value equation is calculated (FIG. 10). RGB signal of foreground pixel 2 given from the input unit 52 is sent to multipliers 23, 24 and 25 together with a coefficient supplied from the register 8. The sum of the result, $EIN_n$ and $EOUT_n$ is obtained by multipliers 26 and 26' and is sent to dividers 27 and 28 together with $DIN_n$ and $DOUT_n$. Output results tin and tout from the dividers 27 and. 28 obtained by two sets of identification function parameters for the inner and outer planes 50 and 51 are checked by a comparator 29 as to whether they are larger or smaller than 1. The results are allocated and are outputted as key value k after clipping processing. A flow chart for allocation is given in FIG. 11.

Color conversion unit

In the image compositing system 6 (FIG. 3) downstream of the chroma-key processing system 5, composite processing of foreground with another background is performed by the following composite equation:

$$C_{dst} = kC_{front} + (1-k)C_{back}$$
$$= k\begin{pmatrix} r_{front} \\ g_{front} \\ b_{front} \end{pmatrix} + (1-k)\begin{pmatrix} r_{back} \\ g_{back} \\ b_{back} \end{pmatrix}$$

where $C_{dst}$, is color data of image after composite, $C_{front}$ is color data of an object (foreground) and $C_{back}$ is color data of background which is prepared independently of the foreground. The value k is obtained by the alpha value calculation unit 11.

To obtain $C_{dst}$ which is the data of the composited image, it is necessary to give $\alpha C_{front}$ and this value is measured by the color conversion unit 12. If the blue-back foreground material image is calculated by the above composite equation, $C_{dst}$ in the equation is the input color data $C_r$ in the processing obtained as the foreground material, $C_{front}$ is the color of the foreground portion in the input image and $C_{back}$ is the background representative color $C_o$ in the input image. In this case, $\alpha C_{front}$ can be calculated using the equation:

$$\alpha C_{front} = C_{dst} - (1-k)C_{back}$$
$$= C_r - (1-k)C_0$$

Figure 12:
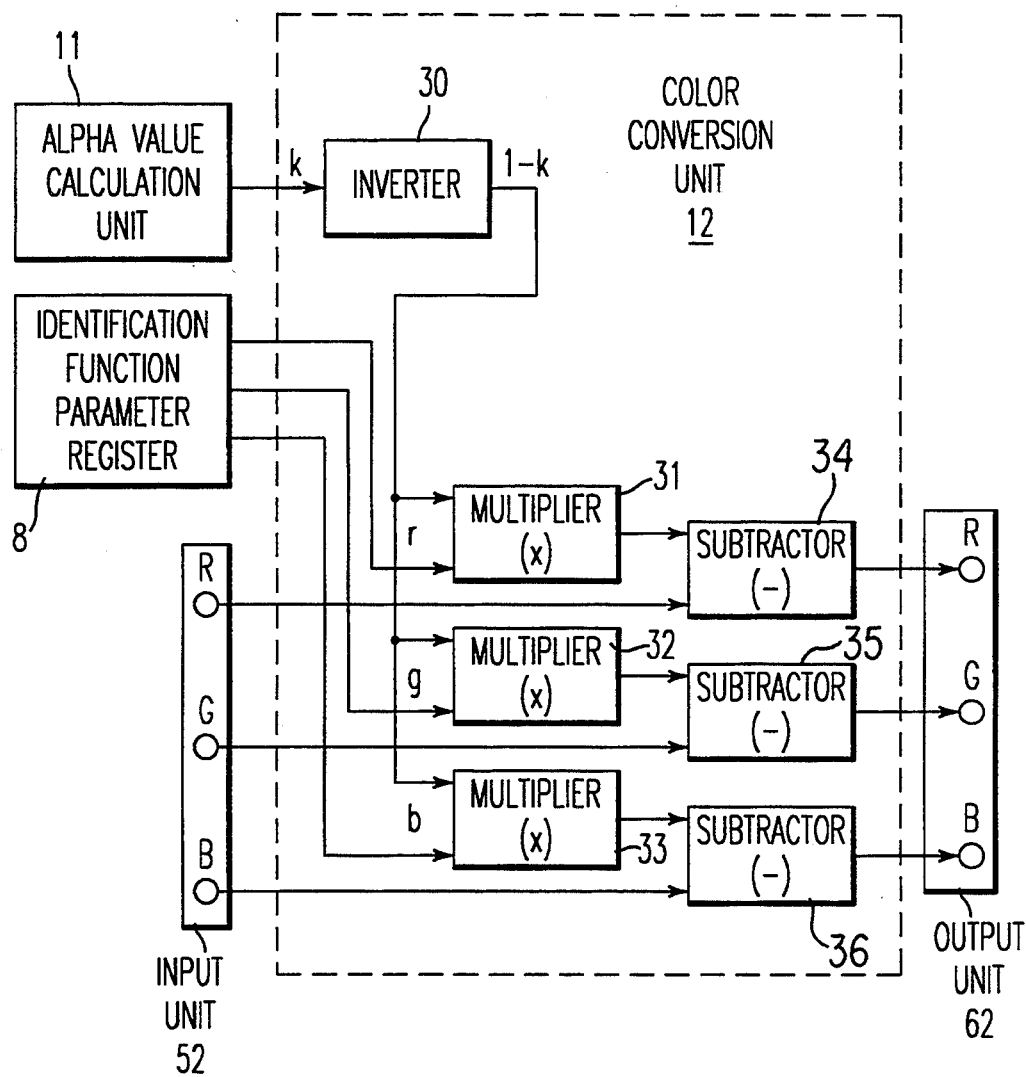
FIG. 12 is a block diagram of a color conversion unit.

FIG. 12 shows internal processing of the color conversion unit 12. The value k obtained in the above is subtracted from 1 by an inverter 30 and is given to multipliers 31, 32 and 33 together with the components of the background representative color $C_o$. RGB data thus obtained are given to subtracters 34, 35 and 36 together with RGB data of the foreground pixels and results are outputted from an output unit 62.

Key value parameter input

To set the parameters necessary for calculation of key value k, the following procedure is taken: First, the foreground material image is displayed on a computer display 38 (FIG. 7). Next, on this screen, the portions which can be considered to be the background are sampled by a position pointer 39 such as a mouse or tablet. The sampling is effected by, for example, specifying a rectangular area to take up RGB data within this area or continuously sampling positions where the cursor passes through. An average value of the RGB data thus sampled is used as the background representative color $C_o$. A smaller hexoctahedron 40 is prepared which contains all sampled data in it.

The hexoctahedron 40 (FIG. 2) is determined as follows: The following procedure is repeated for all sampled RGB data. Using the color data location unit 10 (FIG. 7), it is checked as to which of triangular pyramids 46 constituting the hexoctahedron 40 the data are in. If the data are in the triangular pyramid 46 within the smaller hexoctahedron 40, it is advanced to the next data processing. If it is outside, a plane 50 (FIG. 4) is obtained by numerical calculation (gradient method) where the sum of the distances (segments) between the crossing points of each axis of triangular pyramids 46 with the plane passing through the data point and the background representative color $C_o$ becomes minimal and this is regarded as the plane 50 of the inner hexoctahedron 40. If each segment is shorter than the length of the segment of the plane which has been present up to that moment, the previous segment is used. This prevents the data already classified as being inside the smaller hexoctahedron 40 from being newly classified to outside.

By the above procedure, parameters are set for the hexoctahedron 40 and, actually, foreground extraction and test composite are accomplished. As the result, if the foreground portion completely remains on screen, the same shape determination method is repeated by the above sampling procedure until there will be no more complete background portion.

Next, the larger hexoctahedron 41 is defined. First, a considerably large value as 26 segments of the outer hexoctahedron 41 is provisionally inputted. For this, a predetermined value is substituted or a user sets an adequate value manually. Since the outer hexoctahedron 41 is considerably large, the portion inherently to be completely in the foreground is also included in a dissolve region. By test composite, an image is obtained in which the foreground portion is discolored and is semitransparent. By the above sampling procedure, the portion which should be classified to the foreground is sampled. As a result, the larger hexoctahedron 41 is prepared in which all sampled data are outside of it.

This shape determination method is different from that of the smaller hexoctahedron 40 and is as follows: For all RGB data sampled, the following procedure is repeated. Using the color data location unit 10, it is checked as to which of the triangular pyramids 46 constituting the hexoctahedron 41 the data are in. If the data are outside the plane of the larger hexoctahedron 41 in the triangular pyramid 46 at present, it is advanced to the next data processing. If the data are inside, the plane 51 is determined such that the distances (segments) between the crossing points of each axis of triangular pyramid 46 with the plane 51 passing through the data point and the background representative color $C_o$ are proportional to sine the of the angle between the straight line connecting the data point with the background representative color $C_o$ and each axis. If each segment is longer than the length of the segment of the plane 51 which has been present up to that moment, the same calculation is performed with the plane using the previous section. This prevents the data which is already classified as being outside the larger hexoctahedron 41 from being are newly classified to inside.

It is to be understood that the present invention is not limited to the above-mentioned embodiment and that various modifications may be made without departing from the true spirit of the present invention.

According to the present invention, it is possible to composite contour, blurred edge, out-of-focused edge, semitransparent object, object shadow, extremely complicated object such as hair blown by wind, net, cloud, flame, etc. of foreground in natural manner, which cannot be effected by the conventional chroma-key methods.

Setting of key parameters including soft key parameters is facilitated by pointing a complete background portion or a complete foreground portion, using a position pointer such as tablet or mouse.

What is claimed is:

1. A chroma-key processing method for extracting an object to be foreground from a material image in the form of data of three primary colors RGB, using difference of color, and for obtaining a key value for a composite with a background image, which comprises dividing a three-dimensional space having three primary colors RGB as 3 orthogonal axes into 48 triangular pyramids having common representative background color as apices, setting an inner plane as a border between a background region and a soft key region with respect to each of the triangular pyramids to provide an inner hexoctahedron which defines a discriminative border of the background region in the RGB three-dimensional space, setting an outer plane as a border between a foreground region and the soft key region with respect to each of the triangular pyramids to provide an outer hexoctahedron which defines a discriminative border of the foreground region in the RGB three-dimensional space, making an interior division of the two hexoctahedrons to obtain a hexoctahedron as equipotential surfaces of key value of the soft key region, checking as to which of said 48 triangular pyramids each pixel of a material image belongs, and using parameters from an identification function determined by said inner and outer planes for each of the belonging triangular pyramids to calculate said key value for the composite with the background image.

2. A method according to claim 1 wherein said parameters of the identification function for calculation of said key value are semi-automatically determined on the basis of complete background and/or foreground portion specified by a position pointer such as a mouse or tablet.

3. A chroma-key processing system comprising a color data location unit, said location unit comprising a first subtracter for taking a first difference of RGB data of material pixel from RGB data of background representative color, a second subtracter for taking a second difference between two components of RGB data of said first difference data, an adder for taking a sum of two components of RGB data of said first difference data, sign testers for testing signs of data of said first and second differences and said sum from each of the subtracters and the adder and a look-up table for using nine-bit sign data from each of the sign testers to obtain an index of a belonging triangular pyramid among triangular pyramids constituting a hexoctahedron.

* * * * *